United States Patent
Fekete

(10) Patent No.: US 9,043,036 B2
(45) Date of Patent: *May 26, 2015

(54) SYSTEM AND METHOD FOR WIRELESS IRRIGATION UTILIZING A CENTRALIZED CONTROL SERVER AND FIELD MODULE MATRIX

(75) Inventor: Daniel Joseph Fekete, Fontana, CA (US)

(73) Assignee: American Pipe and Fitting, Inc., Fontana, CA (US)

( * ) Notice: Subject to any disclaimer, the term of this patent is extended or adjusted under 35 U.S.C. 154(b) by 1052 days.

This patent is subject to a terminal disclaimer.

(21) Appl. No.: 13/086,815

(22) Filed: Apr. 14, 2011

(65) Prior Publication Data

US 2011/0190948 A1 Aug. 4, 2011

Related U.S. Application Data

(63) Continuation of application No. 12/109,884, filed on Apr. 25, 2008, now Pat. No. 8,024,075.

(60) Provisional application No. 61/012,019, filed on Dec. 6, 2007, provisional application No. 60/992,673, filed on Dec. 5, 2007.

(51) Int. Cl.
*G05D 11/00* (2006.01)
*G05B 15/02* (2006.01)
*B05B 12/12* (2006.01)
*A01G 25/16* (2006.01)

(52) U.S. Cl.
CPC .............. *G05B 15/02* (2013.01); *B05B 12/12* (2013.01); *A01G 25/16* (2013.01)

(58) Field of Classification Search
None
See application file for complete search history.

(56) References Cited

U.S. PATENT DOCUMENTS

| | | | | |
|---|---|---|---|---|
| 4,852,802 A | * | 8/1989 | Iggulden et al. | 239/64 |
| 5,479,339 A | * | 12/1995 | Miller | 700/16 |
| 5,870,302 A | * | 2/1999 | Oliver | 700/11 |
| 6,314,340 B1 | * | 11/2001 | Mecham et al. | 700/284 |
| 6,437,692 B1 | * | 8/2002 | Petite et al. | 340/540 |
| 6,597,991 B1 | * | 7/2003 | Meron et al. | 702/3 |
| 6,600,971 B1 | * | 7/2003 | Smith et al. | 700/284 |
| 6,823,239 B2 | * | 11/2004 | Sieminski | 700/284 |

(Continued)

OTHER PUBLICATIONS

Lea-Cox, J.D.; Ristvey, A.G.; Rodriquez, A.; Ross, D.S.; Anhalt, J. and Kantor, G., A Low-Cost Multihop Wireless Sensor Network, Enabling Real-Time Management of Environmetal Data for the Greenhouse and Nursery., 2007, Proceedures of IS on Greensys 2007.*

(Continued)

*Primary Examiner* — Mohammad Ali
*Assistant Examiner* — Kelvin Booker
(74) *Attorney, Agent, or Firm* — Loza & Loza LLP; Heidi L. Eisenhut

(57) ABSTRACT

The invention is a centralized server-based system containing a database with relevant information regarding features, parameters, and characteristics of a particular irrigation system, which utilizes proprietary irrigation software to control a plurality of field modules, at one or more remote locations, via a network bridge adapter. An irrigation system may comprise a single server, or multiple servers that may be configured so that control of the entire system is centralized, and control of one or multiple irrigation locations may be accomplished remotely by wirelessly accessing, monitoring and controlling a location's field module matrix.

20 Claims, 8 Drawing Sheets

(56) References Cited

U.S. PATENT DOCUMENTS

| | | | |
|---|---|---|---|
| 6,944,523 B2* | 9/2005 | Addink et al. | 700/284 |
| 7,010,395 B1* | 3/2006 | Goldberg et al. | 700/284 |
| 7,010,396 B2* | 3/2006 | Ware et al. | 700/284 |
| 7,050,887 B2* | 5/2006 | Alvarez | 700/284 |
| 7,058,478 B2* | 6/2006 | Alexanian | 700/284 |
| 7,133,800 B2* | 11/2006 | Delin et al. | 702/125 |
| 7,146,254 B1* | 12/2006 | Howard | 700/284 |
| 7,182,272 B1* | 2/2007 | Marian | 239/69 |
| 7,216,659 B2* | 5/2007 | Caamano et al. | 137/1 |
| 7,264,177 B2* | 9/2007 | Buck et al. | 239/63 |
| 7,266,428 B2* | 9/2007 | Alexanian | 700/284 |
| 7,317,969 B2* | 1/2008 | Lorton et al. | 700/275 |
| 7,317,972 B2* | 1/2008 | Addink et al. | 700/284 |
| 7,328,089 B2* | 2/2008 | Curren | 700/284 |
| 7,400,944 B2* | 7/2008 | Bailey et al. | 700/284 |
| 7,403,840 B2* | 7/2008 | Moore et al. | 700/284 |
| 7,412,303 B1* | 8/2008 | Porter et al. | 700/284 |
| 7,584,023 B1* | 9/2009 | Palmer et al. | 700/284 |
| 7,590,471 B2* | 9/2009 | Jacobsen et al. | 700/282 |
| 7,596,429 B2* | 9/2009 | Cardinal et al. | 700/284 |
| 7,751,942 B2* | 7/2010 | Lorton et al. | 700/275 |
| 7,769,494 B1* | 8/2010 | Simon et al. | 700/284 |
| 7,788,970 B2* | 9/2010 | Hitt et al. | 73/73 |
| 7,789,321 B2* | 9/2010 | Hitt | 239/63 |
| 7,805,221 B2* | 9/2010 | Nickerson | 700/284 |
| 7,853,363 B1* | 12/2010 | Porter et al. | 700/284 |
| 7,877,168 B1* | 1/2011 | Porter et al. | 700/284 |
| 7,883,027 B2* | 2/2011 | Fekete | 239/11 |
| 7,917,249 B2* | 3/2011 | Jacobsen et al. | 700/282 |
| 8,024,075 B2* | 9/2011 | Fekete | 700/284 |
| 8,219,254 B2* | 7/2012 | O'Connor | 700/284 |
| 8,538,592 B2* | 9/2013 | Alexanian | 700/284 |
| 8,565,904 B2* | 10/2013 | Bragg et al. | 700/67 |
| 8,606,415 B1* | 12/2013 | Woytowitz et al. | 700/284 |
| 8,615,329 B2* | 12/2013 | O'Connor | 700/282 |
| 8,620,480 B2* | 12/2013 | Alexanian | 700/284 |
| 8,649,907 B2* | 2/2014 | Ersavas | 700/275 |
| 8,660,705 B2* | 2/2014 | Woytowitz et al. | 700/284 |
| 8,733,165 B2* | 5/2014 | Hern et al. | 73/170.17 |
| 2001/0049563 A1* | 12/2001 | Addink et al. | 700/19 |
| 2004/0083833 A1* | 5/2004 | Hitt et al. | 73/866 |
| 2004/0090329 A1* | 5/2004 | Hitt | 340/552 |
| 2004/0090345 A1* | 5/2004 | Hitt | 340/870.11 |
| 2004/0100394 A1* | 5/2004 | Hitt | 340/870.11 |
| 2004/0244833 A1* | 12/2004 | Buhler | 137/78.2 |
| 2005/0090936 A1* | 4/2005 | Hitt et al. | 700/284 |
| 2006/0027676 A1* | 2/2006 | Buck et al. | 239/63 |
| 2006/0144957 A1* | 7/2006 | Jacobsen et al. | 239/69 |
| 2007/0293990 A1* | 12/2007 | Alexanain | 700/284 |
| 2008/0000840 A1* | 1/2008 | Zupancic | 210/742 |
| 2008/0119948 A1* | 5/2008 | O'Connor | 700/9 |
| 2008/0129495 A1* | 6/2008 | Hitt | 340/539.26 |
| 2008/0288116 A1* | 11/2008 | Nickerson | 700/284 |
| 2009/0007706 A1* | 1/2009 | Hitt et al. | 73/866 |
| 2009/0150002 A1* | 6/2009 | Fekete | 700/284 |
| 2009/0204265 A1* | 8/2009 | Hackett | 700/284 |
| 2009/0271044 A1* | 10/2009 | Bangalore | 700/284 |
| 2009/0271045 A1* | 10/2009 | Savelle et al. | 700/284 |
| 2009/0281672 A1* | 11/2009 | Pourzia | 700/284 |
| 2010/0030389 A1* | 2/2010 | Palmer et al. | 700/284 |
| 2010/0030476 A1* | 2/2010 | Woytowitz et al. | 702/3 |
| 2010/0094472 A1* | 4/2010 | Woytowitz et al. | 700/284 |
| 2010/0145530 A1* | 6/2010 | Nickerson et al. | 700/284 |
| 2010/0152909 A1* | 6/2010 | Hitt et al. | 700/284 |
| 2010/0222932 A1* | 9/2010 | O'Connor | 700/284 |
| 2010/0250198 A1* | 9/2010 | Lorton et al. | 702/188 |
| 2010/0312404 A1* | 12/2010 | Nickerson | 700/284 |
| 2011/0077785 A1* | 3/2011 | Nickerson et al. | 700/284 |
| 2011/0093123 A1* | 4/2011 | Alexanian | 700/284 |
| 2011/0111700 A1* | 5/2011 | Hackett | 455/41.2 |
| 2011/0137472 A1* | 6/2011 | Hitt et al. | 700/284 |
| 2011/0224836 A1* | 9/2011 | Hern et al. | 700/284 |
| 2011/0238227 A1* | 9/2011 | Hern et al. | 700/284 |
| 2011/0238228 A1* | 9/2011 | Woytowitz et al. | 700/284 |
| 2011/0238229 A1* | 9/2011 | Woytowitz et al. | 700/284 |
| 2011/0301767 A1* | 12/2011 | Alexanian | 700/284 |
| 2012/0036091 A1* | 2/2012 | Cook | 705/412 |
| 2012/0095604 A1* | 4/2012 | Alexanian | 700/284 |
| 2012/0191261 A1* | 7/2012 | Nickerson | 700/284 |
| 2012/0229284 A1* | 9/2012 | Hern et al. | 340/618 |
| 2012/0259473 A1* | 10/2012 | Nickerson et al. | 700/284 |
| 2012/0273704 A1* | 11/2012 | O'Connor | 251/129.04 |
| 2013/0116837 A1* | 5/2013 | Malaugh et al. | 700/284 |
| 2013/0226357 A1* | 8/2013 | Ersavas et al. | 700/284 |
| 2013/0253712 A1* | 9/2013 | Alexanian | 700/284 |
| 2014/0031996 A1* | 1/2014 | Nickerson et al. | 700/284 |
| 2014/0172180 A1* | 6/2014 | Woytowitz et al. | 700/284 |

OTHER PUBLICATIONS

Lea-Cox, J.D.; Rodriquez, F.A.; Ristvey, A.G.; Ross, D.S. and Kantor, G., "Wireless Sensor Networks in Precisely Monitor Substrate Moisture and Electrical Conductivity Dynamics in a Cut-Flower Greenhouse Operation", 2009, Proceedures of the IS on High Technology for Greenhouse Systems.*

Lea-Cox, J.D.; Ristvey, A.G.; Ross, D.S.; and Kantor, George F., "Deployment of Wireless Sensor Networks for Irrigation and Nutrient Management in Nursey and Greenhouse", 2009, SNA Research Conference.*

Shah, N.G.; Desai, U.B.; Das, I.; Merchant, S.N. and Yadav, S.S., "In-Field Wireless Sensor Network (WSN) for Estimating Evaportranspiration and LeafWetness", 2009, International Agricultural Engineering Journal 2009, 18 (3-4): 43-51.*

* cited by examiner

SYSTEM AND METHOD FOR WIRELESS IRRIGATION UTILIZING A CENTRALIZED CONTROL SERVER AND FIELD MODULE MATRIX

PRIORITY NOTICE

The present application claims priority, under 35 USC §199(e) and under 35 USC §120, to the following U.S. Provisional Patent Application Ser. No. 61/012,019, filed on Dec. 6, 2007, and Application Ser. No. 60/992,673, filed on Dec. 5, 2007, the disclosure of which is incorporated herein by reference in its entirety.

COPYRIGHT & TRADEMARK NOTICE

A portion of the disclosure of this patent application may contain material that is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or to limit the scope of this invention to material associated only with such marks.

TECHNICAL FIELD OF THE INVENTION

The present invention relates in general to a system and method for wireless irrigation utilizing a centralized control server and a plurality of field modules, and in particular, a centralized server-based system, which utilizes proprietary irrigation software to control a plurality of field modules, at one or more remote locations, via a network bridge adapter. The centralized control server is configured to monitor and control irrigation zones within an irrigation system throughout a wireless communication medium.

BACKGROUND OF THE INVENTION

Typically, irrigation systems depend on the control of various components in order to achieve a synchronized and dependable irrigation schedule that considers a multitude of factors, which must be calculated, in order to compensate for different field characteristics.

For example, while one particular terrain may require a large quantity of water, in that same irrigation field, another part of the terrain may require less water. This is often the case in irrigation systems that irrigate different types of targets in one field, or in systems that cover large landscapes that include various elevations or different types of soil.

Along with the problem of dealing with the numerous variables that affect different types of water schedules, irrigation systems must also keep water conservation issues at the core of a system's performance requirements. Various types of pipeline networks are created to adequately reach different irrigation targets, planned carefully to minimize wasting water.

In large irrigation fields, a main pipeline will have multiple sub-mains branching out with various laterals to deliver thousands of gallons to the various targets. Throughout the irrigation lines, multiple valves and pumps are used to control water flow and different types of check-valves are often implemented to prevent problems such as backflow or low head drainage.

Thus, a multitude of problems must be managed and solved by irrigation systems to adequately perform their tasks. Perhaps the most prominent problem is the management and control of the various valves, pumps, sensors, or devices that may be implemented in particularly large irrigation systems. This problem is naturally magnified in industrial size irrigation systems which may comprise several irrigation fields with different requirements and characteristics.

Traditionally, every single valve, pump, sensor, or irrigation device utilized within a particular system required manual calibration and operation. Naturally, such manual operation limits a particular irrigation scheme by requiring multiple personnel to manage and maintain each irrigation component.

More recently, several irrigation systems have been developed, which utilize controllers coupled to different devices implemented within an irrigation system. For example, controllers have been developed to automatically shut off valves at pre-set times. Controllers have also been adapted to turn pumps on and off, and even more recently, controllers have been developed, which comprise complex programming that controls a particular irrigation area within an irrigation system.

A serious drawback however, is the cost of each individual unit, of which many must be utilized to cover a single irrigation field, particularly in industrial size irrigation schemes where several locations encompass a single irrigation system. A single controller may cost thousands of dollars due to their complexity, and industrial irrigation systems often need hundreds of controllers to properly cover a single location alone.

Each controller must be connected to a power source which often involves miles of wiring that must be used to connect controllers, to each other, and to a particular component that a controller may be configured to manage. In addition to increasing the costs of such operations, wiring an irrigation field is a complex procedure. Proper insulation techniques must be utilized to adequately implement the necessary wiring to prevent faulty connections between controllers and keep the irrigation system safe for personnel that must have access to the irrigation field. Thus, simply implementing such controllers may encompass a complicated endeavor that requires use of valuable resources before an irrigation system is fully operational.

Furthermore, maintenance for each unit is required to frequently update its programming upon changes that naturally occur in the field. As new information is received and administered by an irrigation system, this information must be implemented to each individual controller so that the correct parameters are used in tasks, for example, such as calculating irrigation schedules.

Personnel, equipped with information previously gathered through sensors or other relevant sources of field information, are often deployed in the field to individually access each controller and manually set the correct parameters.

Therefore, there is a need in the art for an irrigation system that is more efficient, less-expensive and more cost-effective, and that is able to provide adequate irrigation control of an irrigation field without the need to physically maintain, monitor, or manually actuate each of the different devices that may be implemented in modern industrial irrigation schemes. It is to these ends that the present invention has been developed.

SUMMARY OF THE INVENTION

To minimize the limitations in the prior art, and to minimize other limitations that will be apparent upon reading and understanding the present specification, the present invention describes a system and method for wireless irrigation utilizing a centralized control server and plurality of field modules.

A centralized server-based system containing a database with relevant information regarding features, parameters, and characteristics of a particular irrigation system, utilizes proprietary irrigation software to control a plurality of field modules, at one or more remote locations, via a network bridge adapter. An irrigation system may comprise a single server, or multiple servers that may be configured so that control of the entire system is centralized, and control of one or multiple irrigation locations may be accomplished remotely.

One irrigation system, in accordance with the present invention comprises a server adapted to control an irrigation area, wherein said server is configured for: receiving data pertaining to said irrigation area, and generating a control signal based on said data. Furthermore, such system includes an irrigation field module matrix comprising a plurality of field modules, wherein one or more field modules is adapted to: send said data pertaining to said irrigation area to said server, receive said control signal from said server, and controlling a plurality of irrigation components based on said control signal.

Another irrigation system, in accordance with the present invention comprises a server adapted to control one or more irrigation areas, said server including a user interface adapted to provide a user remote access to said server, wherein said server is configured for: receiving data pertaining to said irrigation area, wherein said data pertaining to said irrigation area comprises a system status, and generating a control signal based on said data.

Furthermore, such system includes an irrigation field module matrix adapted for single-hop and multi-hop communication for receiving said control signal and sending said data comprising a plurality of field modules, wherein one or more field modules is adapted to: send said data pertaining to said irrigation area to said server, receive said control signal from said server, and control a plurality of irrigation components based on said control signal.

The server communicates with the field module matrix using a communication medium adapted to route said data from said field module matrix to said server and route said control signal from said server to said field module matrix, wherein said communication medium further comprises a wireless network adapter proximate said field modules, which translates between a protocol in use by said field modules and said server; wherein generating said control signal further comprises: generating an irrigation schedule, making determinations based on a hydraulic analysis of said data, making determinations based on an interpolation of sensor data gathered from said data, and making determinations based on evapotranspiration data gathered from said data.

A method for controlling an irrigation system, in accordance with the present invention comprising the steps of: creating an irrigation field module matrix by placement of a plurality of field modules within an irrigation area; sending data pertaining to said irrigation area from said field modules to a server adapted to receive said data; generating a control signal based on said data; sending said control signal to said field modules adapted to receive said control signal; and controlling a plurality of irrigation components coupled to said field modules based on said control signal.

It is an objective of the present invention to minimize the rising cost of irrigation systems by eliminating the need for wiring systems.

It is another objective of the present invention to provide a centralized control system that does not depend on the use of complex controllers to actuate irrigation devices.

It is yet another objective of the present invention to provide a central control server that is capable of managing several irrigation locations from a single remote location, utilizing wireless capabilities.

It is yet another objective of the present invention to provide individual field modules that are inexpensive and require minimum maintenance, capable of receiving control signals from a remote location without the need for complex wiring systems.

Finally, it is yet another objective of the present invention to provide a control server which maintains a database on one or more irrigation areas and utilizes software to monitor and control the entire irrigation system.

These and other advantages and features of the present invention are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE DRAWINGS

In the following discussion that addresses a number of embodiments and applications of the present invention, reference is made to the accompanying drawings that form a part hereof, where depictions are made, by way of illustration, of specific embodiments in which the invention may be practiced. It is to be understood that other embodiments may be utilized and changes may be made without departing from the scope of the present invention.

Figure 1:
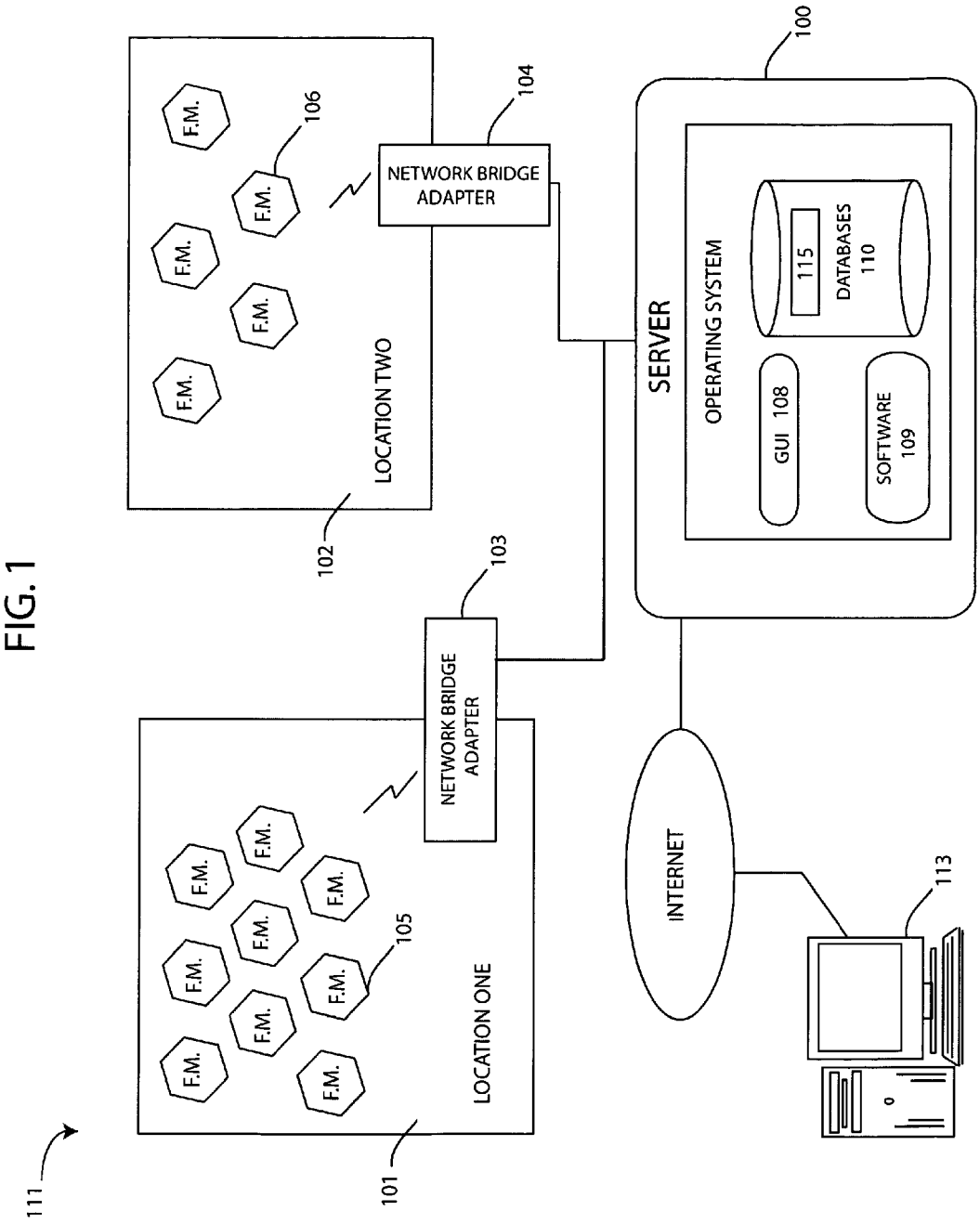
FIG. 1 illustrates an overview diagram of a server controlled irrigation system configured to control two irrigation areas from a remote location, in accordance with one embodiment of the present invention.

FIG. 1 illustrates an overview diagram of a server controlled irrigation system configured to control two irrigation areas from a remote location, in accordance with one embodiment of the present invention.

Irrigation system 111 comprises of a central control server 100, which utilizes a wireless connection to communicate with field modules 105 located at a first location, and field modules 106 located at a second location. Central control server 100 monitors and controls field modules 105 and 106 via corresponding network bridge adapters 103 and 104, each located at first and second locations, wherein field modules 105 make up wireless mesh irrigation network 101, and wherein field modules 106 make up wireless mesh irrigation network 102. Irrigation system 111 further comprises of access station 113, which may be used to access central control server 100 from any location to monitor, maintain, upgrade, or utilize central control server 100, for example, by accessing central control server 100 via the internet.

In an exemplary embodiment, irrigation system 111 utilizes a wired or wireless irrigation network to automate the function of irrigation components and provide interfaces via standard and proprietary protocols to users for the purpose of reporting and configuration of the system's operation. Central control server 100 may communicate with sensory components in the irrigation system to retrieve the necessary data for use in algorithms that may, in turn, create schedules for, modify or interrupt valve and pump operation in real time.

Central control server 100 may communicate with each of the wireless mesh irrigation networks 101 and 102 through network bridge adapters 103 and 104, respectively. Network bridge adapters 103 and 104 in turn translate between the network protocol to which central control server 100 connects to and the protocol in use by an irrigation network.

In one embodiment, central control server 100 has the ability to connect to multiple wired and wireless irrigation networks via multiple protocols through standard and proprietary network bridges. This may be desirable to facilitate control of different types of networks and allows central control server 100 to connect to networks at other remote locations, provided a communications link exists at those other locations.

In another embodiment, central control server 100 may also connect to the internet via standard methods. This is desirable to enable central control server 100 to connect to other irrigation servers (not shown) to share information; manage them as "slave" servers, or mutually backup data to increase redundancy and thus reliability.

In an exemplary embodiment, in order to properly administrate irrigation system 111, central control server 100 may store information related to irrigation system 111's configuration by means of flat-files or databases, such as databases 110. For example, and without limiting the scope of the present invention, data 115 may include information vital to calculations such as component specifications and limits, component locations, soil characteristics, plant characteristics and requirements, pipe sizes and material, or any other data relevant to the administration of central control server 100. Furthermore, other specifics of a particular location may be included, for example, and without deviating from the scope of the present invention, databases 110 may include information that is necessary for maintenance and inventory of wireless mesh irrigation network 102, such as field modules 105's component make, model, quantity, or any other type of information to aid wireless mesh irrigation network 102's administration.

In an exemplary embodiment, central control server 100 utilizes proprietary software, for example software 109. Software 109 may utilize specific algorithms that analyze data regarding irrigation system 111's current state, and compare with a previous state, to calculate required actions for irrigation system 111's optimization.

In the present disclosure, a "system status" refers to irrigation system 111's status as a whole, being comprised of a totality of variables relating to the operation of irrigation system 111. For example, and without deviating from the scope of the present invention, such variables may include, but are not limited to: line pressures, total and local system flows, pump speed and output, sprinkler head state (e.g. on/off/not responding), soil moisture, current weather/evapotranspiration (ET), historical weather/ET, forecasted weather, system component malfunction, and any arbitrary or calculated restrictions on irrigation system 111's operation.

Calculated data is then sent to a scheduler, which runs as a background service on central control server 100. In one embodiment, a scheduler component of software 109 is responsible for all timed events and actually sends the commands to the components in the field, for example field modules 105 and 106, at the appropriate times or immediately, as required (see FIG. 6).

In an exemplary embodiment, central control server 100 further comprises a primary graphical user interface (GUI) 108, which may be accessed through input/output devices such as a keyboard, a mouse and monitor, for purposes of facilitating human interface. In another embodiment, in addition to providing local server based GUI 108, central control server 100 may serve HTTP requests on its network interfaces for a web-based GUI (see FIG. 2). In yet another embodiment, central control server 100 may support modular GUI extensions for any number of interfaces.

These GUIs are desirable to enable users to monitor the status and history of operation of irrigation system 111, receive alerts regarding important system events, and modify the configuration for irrigation system 111 as a whole, as well as each individual component thereof, such as schedules for field modules 105 and 106.

For example, and without limiting the scope of the present invention, a user such as a remote site manager may use access station 113 to view a status of a particular schedule for wireless mesh irrigation network 102 via a web-based GUI supported by central control server 100 that is accessed using the internet.

In yet another embodiment, central control server 100 may employ a tiered user/group database which will allow site managers to control restrictions of certain privileges to users and groups of users based on their requirements.

Typically, software 109 further comprises of a suite of proprietary irrigation control software running on commodity enterprise-grade server hardware. Software 109 will include components of central control server 100 that may communicate via standard system calls, and both proprietary and standard application programming interfaces (API's) available through the software components, operating system, and underlying hardware.

In one embodiment, central control server 100 may employ a suite of proprietary irrigation control software running on commodity enterprise-grade server hardware to gather information and control a varied and comprehensive set of irrigation components that form a complete irrigation system 111.

By means of an informational database and scheduler, the administration of said irrigation system may be intelligently automated to the fullest extent. For such tasks that cannot be performed by central control server 100, central control server 100 may alert the appropriate personnel through various means, for example by sending an alert or electronic message via access station 113.

For the majority of tasks, which can be directly controlled by central control server 100, both network bridge adapters 103 and 104 facilitate communication and provide translation, when necessary, between protocols in use by central control server 100 and each of wireless mesh irrigation networks 101 and 102.

Typically, network bridge adapters 103 and 104 interface with central control server 100 via standard computer networking protocols. For example, such networking protocols may include IEEE 802.3, IEEE 802.11a/b/g, RS-232, RS-485, Universal Serial Bus, or any other equivalent without limiting the scope of the present invention.

Figure 3:
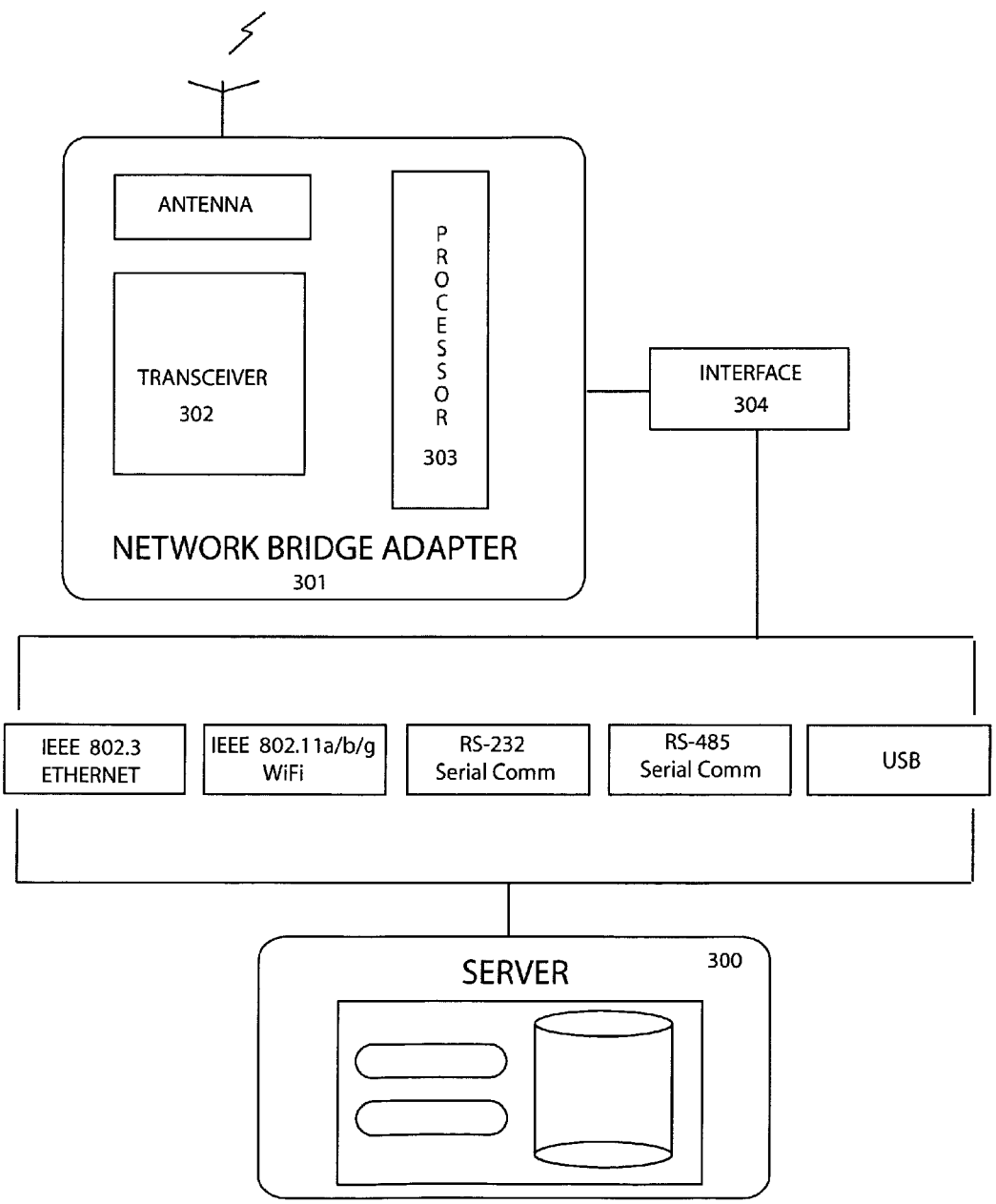
FIG. 3 illustrates a block diagram depicting a network bridge adapter, in accordance to one embodiment of the present invention, which may be utilized to translate information between a central control server and a wireless mesh network, by implementing an interface adaptable to multiple methods of communication.

In an exemplary embodiment, network bridge adapters 103 and 104 interface the wireless mesh irrigation networks 101 and 102, respectively, through a transceiver (see FIG. 3). Each network bridge adapter 103 and 104 may also act as the wireless mesh network coordinator, which is responsible for setting up the wireless network and maintaining its topology and inter-nodal communication.

A network bridge adapter, in accordance with the present invention, may comprise of a server interface(s) to communicate with central control server 100, a processing unit for network coordination and protocol translation, a wireless interface(s) to communicate with the nodes in each wireless mesh network, and a main circuit board wherein all components are connected (see FIG. 3).

Network bridge adapters 103 and 104 are the means by which central control server 100 is able to receive information and send command signals to the various field modules 105 and 106. A monumental advantage to this configuration being that multiple complex and costly controllers often used in modern irrigation schemes are eliminated by providing central control server 100 with total control of irrigation system 111. Substantially all programming, monitoring, and data processing is achieved by central control server 100. Field modules 105 and 106 are merely passive actuators for any irrigation device used in wireless mesh irrigation networks 101 and 102, such as the various pumps and valves that may make up each irrigation zone.

Typically, field modules 105 and 106 operate multiple irrigation valves per unit. In one embodiment, in addition to irrigation valves, field modules 105 and 106 may also interface with any other irrigation equipment that can be controlled and/or monitored (i.e. sensors, pumps, master-valves, etc.) and relay that data with central control server 100 wirelessly, thereby negating the need for any direct hard link to or from a central management location and subsequently eliminating the need for costly satellite controllers in the field.

In an exemplary embodiment, proprietarily developed firmware and hardware create and utilize each of wireless mesh networks 101 and 102, which terminate at central control server 100. Wireless communication between central control server 100 and field modules in any particular irrigation network provides the very significant advantage of circumventing any pre-wiring tasks for implementing wiring that must be utilized with wired networks—such methods are expensive and require expenditure of considerable resources before irrigation of a particular field or zone begins.

Typically, field modules 105 and 106 actuate valve operation, interface with sensors and operate other irrigation components such as pumps and master valves while relaying data to central control server 100. Most importantly, every field module becomes a part of a field module matrix that forms a wireless irrigation network.

In an exemplary embodiment, through deployment of multiple units, wireless mesh irrigation networks 101 and 102 may be formed wherein each unit within each network will act as a transceiver for surrounding units so that each unit will be in communication with central control server 100 by either a direct wireless link (single hop) or through one or more transceivers (multiple hop) located in nearby field modules. With multiple units, an entire field module matrix may be monitored and controlled from central control server 100.

Figure 2:
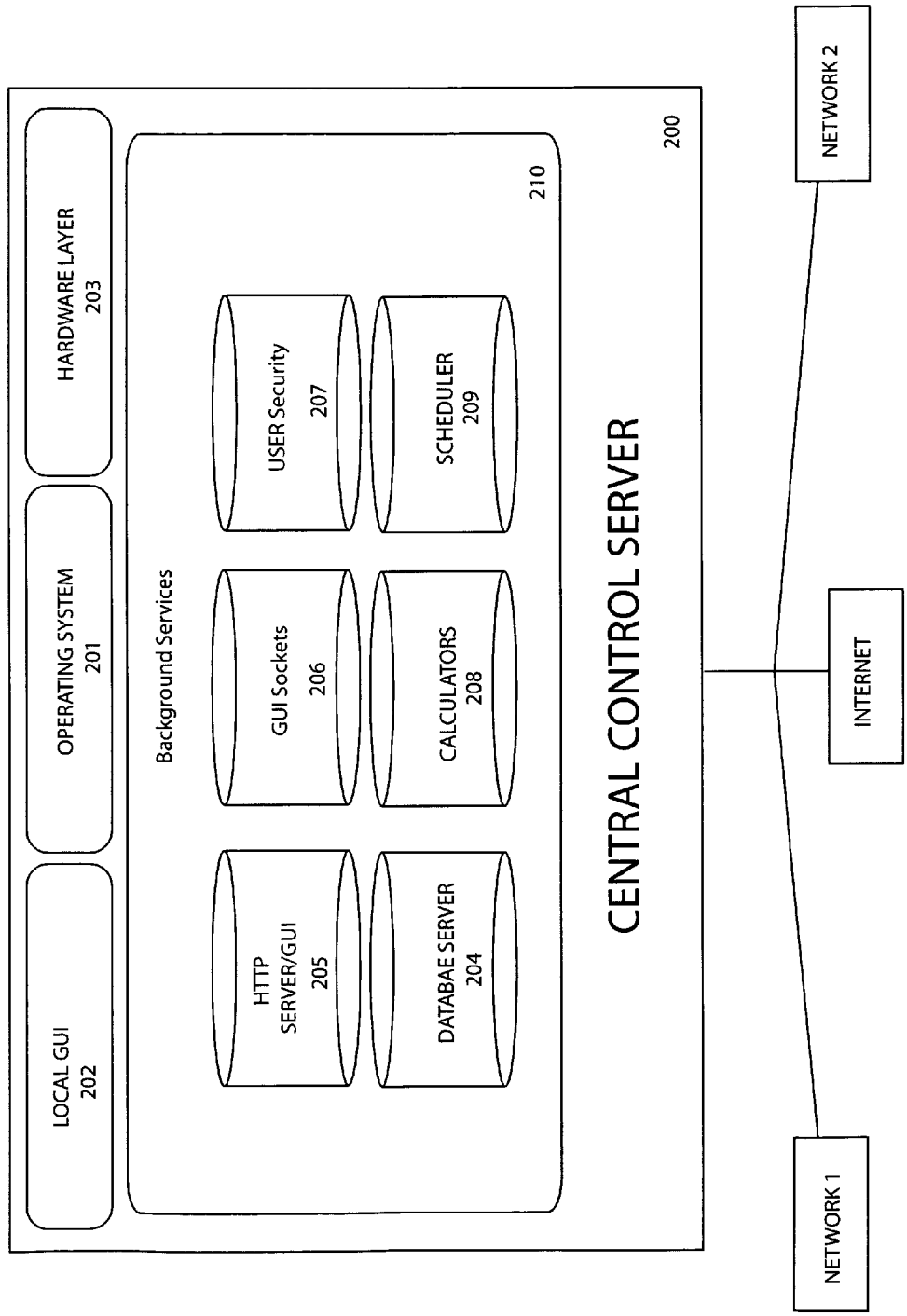
FIG. 2 illustrates a block diagram for an irrigation central control server, which is entirely server-based, capable of communication with multiple mesh networks within an irrigation system. Server 200 is shown, in an exemplary embodiment of the present invention, comprising several background services utilized for remotely monitoring and controlling a plurality of field modules in one or more wireless mesh networks at remote locations.

Central control server 100 may comprise a single server or multiple servers without deviating from the scope of the present invention, and its components may vary depending on the complexity and extent required by an irrigation system. FIG. 2 illustrates another embodiment of a central control server for an irrigation system in accordance with the present invention.

FIG. 2 illustrates a block diagram for an irrigation central control server, which is entirely server-based, capable of communication with multiple mesh networks within an irrigation system. Server 200 is shown, in an exemplary embodiment of the present invention, comprising several background services utilized for remotely monitoring and controlling a plurality of field modules in one or more wireless mesh networks at remote locations.

Server 200 comprises operating system 201, local GUI 202, and hardware layer 203. Server 200 may be a minicomputer, a microcomputer, a UNIX™ machine, a mainframe computer, an Intel™ machine, an Apple™ machine, a PowerPC™ machine, or any other appropriate computer without departing from the scope of the present invention. Particularly for industrial applications, it may be desirable for server 200 to include generic high-availability (redundant) enterprise server hardware for optimum performance.

In an exemplary embodiment, central control server 200 uses generic high-availability (redundant) enterprise server hardware upon which is loaded operating system 201 for facilitating the management of one or more irrigation zones. Operating system 201 further comprise a database server 204 for storage of system characteristics, calculated schedules, collected data from sensors and other information relevant to system operation and maintenance. Operating system 201 further includes a set of services that monitor and act upon incoming data as well as send control signals.

In one embodiment, server 200 sends and receives data to and from one or more field modules by means of wireless network bridge adapters, which may be connected via a Local Area Network (LAN), a Wide Area Network (WAN or Internet), a USB/RS-232/RS-485 serial port, or any other known method without departing from the scope of the present invention.

In another embodiment, a plurality of similar servers may also communicate with server 200 and each other. For example, and without deviating from the scope of the present invention, a first server may communicate with a second server via LAN or WAN. In one embodiment, one server may be given full control over another server and vice versa, allowing many systems to be maintained from any one server. In another embodiment, servers may also store data for a given system independently thereby creating distributed redundant data storage mechanisms ensuring data longevity.

Typically, server 200 further comprises a set of background services 210 that interact and help administrate the various processes occurring at any given time during server 200's operation. Background services 210 may include, without limiting the scope of the present invention, HTTP server/GUI 205, GUI sockets 206, user security server 207, calculators 208, and scheduler 209.

HTTP server/GUI 205 provides a web interface to manage and monitor the system based on user/group permissions. HTTP server/GUI 205 interfaces with GUI socket 206 to enable management and monitoring central control server 200. In an exemplary embodiment, HTTP server/GUI 205 may be available on the Intranet and/or Internet, depending on the network configuration.

GUI socket 206 is basically an application program interface or API, which drives the server 200's local GUI 202. Typically, GUI socket 206 is a server and protocol that facilitates client connections for full or partial control, configured to accept both local and remote connections and provide an abstracted connection to server 200 based on user or group permissions predetermined by a system administrator. Thus, GUI socket 206 is an interface for other processes to access monitoring capabilities on server 200.

User security service 207 is typically similar to known file system permissions. For example, and without limiting the scope of the present invention, user security service 207 may comprise UNIX™ file system permissions. In an exemplary embodiment, each action or query available in the system has permissions set for certain users and groups that allow hierarchal security. For example, users in a "Maintenance" group should be able to turn valves on and off for testing, but not alter scheduling coefficients. Likewise, a "Site Manager" user should have full control over the system, including which permissions other users or user groups may have access to. This configuration of user permissions, managed by user security service 207, may be desirable particularly in large scale irrigation systems that may comprise several personnel on and off the field.

Database server 204 is typically a computer program that provides database services to other computer programs or computers, depending on the configuration of the entire system. In practice, database server 204 may be a MySQL™ or PostgreSQL™ service running on server 200 or on another computer to which server 200 may have access to, without limiting the scope of the present invention.

All system information pertaining to the irrigation system and system administration is preferably stored in database server 204, although in alternative embodiments, server 200 may send a log of processes, commands, schedules, field inventory, or any other type of information relevant to a second slave server, to be stored at a remote location, for example on another database located at the slave server's location.

In an exemplary embodiment, database server 204 stores all relevant information locally. In such embodiment, every time information needs to be stored remotely, server 200 sends that information to the desired remote location in addition to storing such information locally in database server 204. This is desirable so that server 200, as a master server, for example, may contain all the information related to all other servers managed by server 200.

Calculators 208 are typically a set of algorithms and equations that pull data from database 204, (and/or any other database to which server 200 may have access to) for processing such data to make determinations and generate new data. Such new data may pertain to the system's configuration, a system status, a system operation, or any other system determination without deviating from the scope of the present invention. New data may be used immediately and discarded, may be stored for future use, or simply stored as statistical data for generating reports that may be utilized in future determinations, management, or administration of the entire irrigation system.

Scheduler 209 is typically another API, which may run in the background on server 200. In one embodiment, other processes utilize scheduler 209 to log events set to occur at a given time and date. For example, and without deviating from the scope of the present invention, scheduler 209 may be provided with information to be scheduled such as times and dates on which to turn valves or pumps on and off. Scheduler 209 may then store such information in database server 204 either as a log of events that have occurred and operations which have been executed, and/or as schedules for future events and future commands that should be executed at predetermined such times.

In an exemplary embodiment, scheduler 209 monitors database server 204 along with any other external databases to which server 200 may have access to. Scheduler 209 monitors current time utilizing an internal clock and executes commands when scheduled events are due. Scheduler 209 may be instructed to execute a command immediately, in which case the command is executed, but still logged in database 204. In this way, database 204 stores a complete set of all commands, their origination time, and each commands execution time.

FIG. 3 illustrates a block diagram depicting a network bridge adapter, in accordance to one embodiment of the present invention, which may be utilized to translate information between a central control server and a wireless mesh network, by implementing an interface adaptable to multiple methods of communication.

Adapter 301 contains a wireless module 302, processor 303 and wired interface 304. The wired interface may include one or all of the following without deviating from the scope of the present invention: an Ethernet port, USB port, and a DB-9 RS-232 or RS-485 port.

Adapter 301 is configured to receive data packets via wired interface 304 and transmits the data packet over the wireless network with the correct protocol translation. Likewise, packets on the wireless network that are addressed to a device on the wired network (e.g. central control server 300) are received by the network bridge and translated into the appropriate protocol and delivered via one of the wired interfaces.

Figure 4:
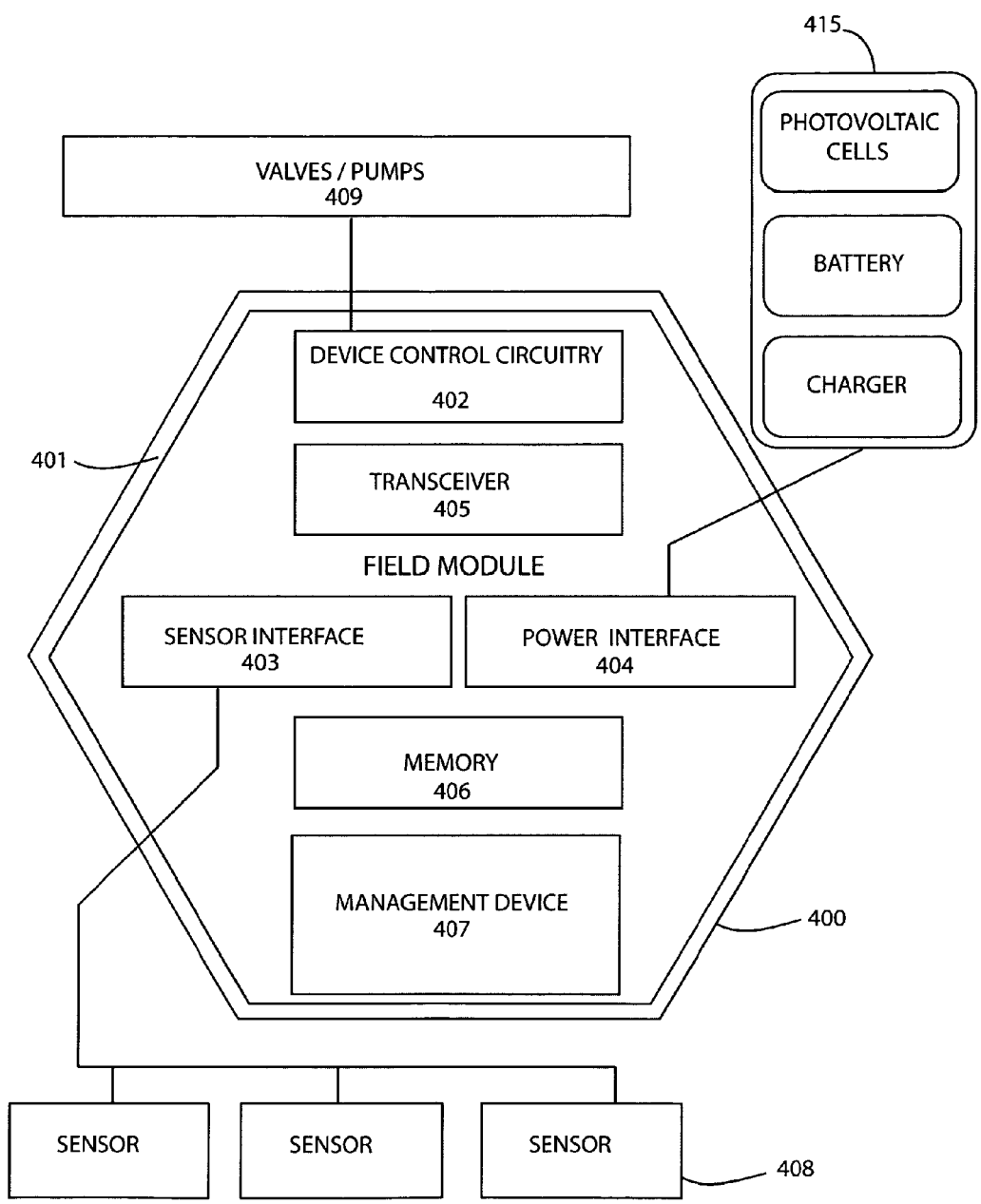
FIG. 4 is an illustration of an exemplary embodiment of a field module in accordance with the present invention, depicting a module's components that allow it to communicate wirelessly with a central control server to either relay information to other field modules, or actuate an irrigation device such as a valve or a pump.

FIG. 4 is an illustration of an exemplary embodiment of a field module in accordance with the present invention, depicting a module's components that allow it to communicate wirelessly with a central control server to either relay information to other field modules, or actuate an irrigation device such as a valve or a pump.

Typically, a field module is very simple and comprises minimal components. Each unit comprises of a circuit board with a processor and interface components, power circuit to utilize and monitor a mains or battery power source, transceiver module, status indicators, and firmware.

In the exemplary embodiment shown, field module 400 comprises watertight housing 401, device control circuitry 402, sensor interface 403, power interface 404, transceiver 405, a memory 406, and a management device 407. Field module 400 is one of a plurality of field modules in a field module matrix. Field module may be connected to one or more sensors 408 and one or more devices 409.

Field module 400 is typically constructed of known durable materials able to withstand various weather conditions, in particular due to housing 401. Management device 407 is connected to wireless transceiver 405, device control circuitry 402, sensor interface circuitry 403, and power interface 404.

Power interface 404 is typically connected to power source 415. Power source 415 may be a battery, a charger, or any other type of power source able to produce the necessary power to keep field module 400 running properly. In one embodiment, power interface 404 is connected to a battery. In another embodiment, power interface 404 is connected to a generator. In an exemplary embodiment, power interface 404 is connected to power source 415 wherein power source 415 comprises photovoltaic cells, a battery and a charger, to constantly provide field module 400 with a source of electrical power without the need of any additional wiring. Power distribution and management of all components is processed by management device 407.

Management device 407 sends and receives data through wireless transceiver 405 and records one or more watering schedules in memory module 406, based on the received data. If field module 400 is connected to several devices, such data may include schedules for each of one or more devices. Field module 400 further generates control signals to execute watering schedules via device control circuitry 402. Management device 407 also reports the status and value of one or more sensors 408 connected to the sensor interface circuitry 405.

In a field module matrix, each module such as field module 400 may transmit data to other modules where each module acts as a repeater for relaying that data. The range of the wireless network is thus extended which is an advantage since the range becomes customizable depending on a user's needs.

Figure 5:
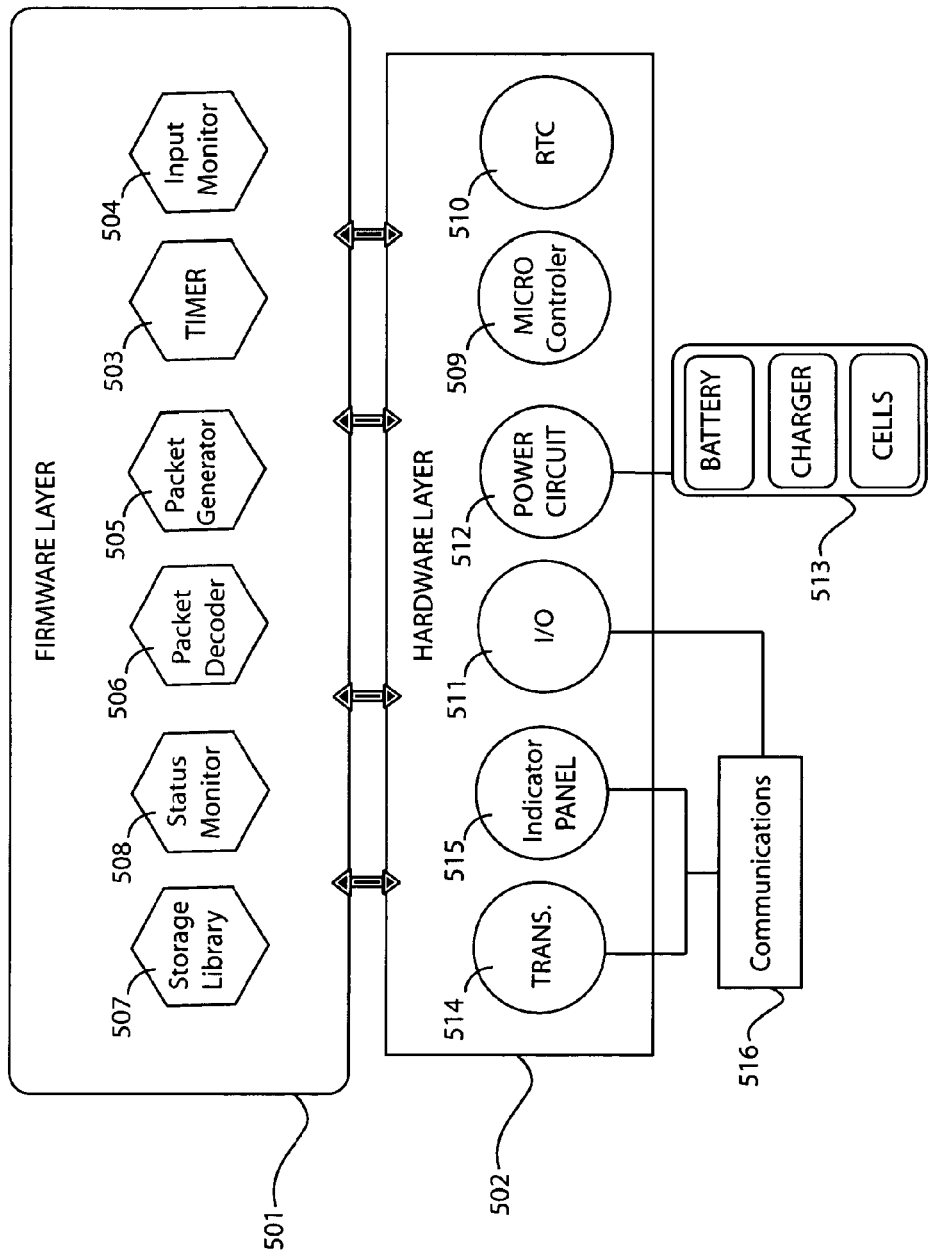
FIG. 5 is an illustration depicting in more detail the interrelation between a hardware layer and firmware layer that make up one embodiment of a field module in accordance with the present invention.

FIG. 5 is an illustration depicting in more detail the interrelation between a hardware layer and firmware layer that make up one embodiment of a field module in accordance with the present invention. More specifically, FIG. 5 illustrates field module 500's components, wherein said components comprise a simple hardware layer and firmware layer.

Field module 500 is equipped with firmware layer 501 and hardware layer 502, which aid field module 500's communication. In this exemplary embodiment, firmware layer 501 comprises timer 503, input monitor 504, packet generator 505, packet decoder 506, storage library 507, and status monitor 508.

Timer 503 is a function that will execute a command after a set amount of time has lapsed from an initial invocation. For example, and without limiting the scope of the present invention, timer 503 is most frequently used for turning a valve off after a specified amount of time has passed from the time the valve was turned on. A valve may be turned on at a particular start time by the scheduler (not shown since scheduler resides at the server level); timer 503 may then be invoked to turn it off after the given duration (i.e. the given duration also predetermined by the scheduler, or an input provided by a user via one of the user interfaces to the server based system).

Input monitor 504 utilizes interrupt handlers tied to microcontroller 509's external interrupts to catch asynchronous signals on an IO channel. Also known in the art as an interrupt service routine (ISR), an interrupt handler is a callback subroutine in an operating system or device driver whose execution is triggered by the reception of an interrupt. These low-level counterparts of event handlers, are initiated by microcontroller 509's external interrupts to interrupt instructions in firmware layer 501' code, which are used for servicing hardware layer 502 and transitions between protected modes of operation such as system calls.

For example, and without deviating from the scope of the present invention, reading a temperature or pressure involves polling a sensor, which puts microcontroller 509 in charge of timing. However, in the case of a flow sensor, where the flow is reported by pulses sent for each rotation of an impeller, the signal is asynchronous and must be caught and timed for a proper reading. If microcontroller 509 misses a pulse or two, the calculation of flow will be inaccurate. It is for this reason that input monitor 504 is configured with low-level ISR's to interrupt normal execution of code to execute time sensitive tasks. This is also true for an alarm signal (e.g. pressure too high/too low, high/low temperature, etc.).

Packet generator 505 is configured to take data that is to be sent across the network and wrap it with the correct protocols in use by the transmission medium between the plurality of field modules and a network bridge adapter. Supplemental to packet generator 505, packet decoder 506 is configured to provide the inverse function of packet generator 505. Since some data packets include information other than data itself (e.g. checksums, sending address, time of transmission, etc.), packet decoder 506 handles this extra information as is appropriate (e.g. respectively: verify the checksum before releasing the data, verifying correct address of data destination, correct transmission time, etc.).

Typically, field module 500 does not employ a database, but comprise of a very simple, low level storage mechanism or storage library 507. Nevertheless, storage library 507 includes a library of functions to facilitate the storage and retrieval of data in field module 500's EEPROM. Storage library 507 may enable the storage of schedules, device configuration, and other information that requires persistence over power cycles.

Status monitor 508 is a routine that may periodically poll the status of certain firmware variables and peripheral devices to maintain a set of registers regarding field module 500's current status. In the present disclosure, registers are memory 'locations' that contain information pertaining to a set of conditions to be checked or monitored in order for other functions or processes to be engaged. Upon monitoring a set of conditions, other processes may then perform certain tasks based on the state of these registers.

For example, and without deviating from the scope of the present invention, real-time clock (RTC) 510 may be polled at regular intervals to update field module 500's time register; or if a data packet is ready to be processed, a register variable may be polled by status monitor 508 to let packet decoder 506 know there is work to be done.

Furthermore, status monitor 508 furthers field module 500's efficiency by utilizing a status function which is a small, fast function that decides if larger, more power hungry functions need to be run. Running such small function periodically may be desirable to save processor time and thus electrical power, as oppose to running every available function on every program loop. This allows for implementation of simple hardware in hardware layer 502.

In this exemplary embodiment illustrated in FIG. 5, hardware layer 502 comprises of microcontroller 509, real-time clock 510, input/output hardware 511, power circuitry 512, transceiver 514, and indicator panel 515.

Microcontroller 509 controls every aspect of field module 500. Typically, microcontroller 509 integrates a central processing unit (CPU) for executing program code, general purpose inputs and outputs (GPIO's), universal asynchronous receivers/transmitters (UART's), non-volatile program memory, and volatile memory (RAM) into a single integrated circuit chip.

Microcontroller 509 holds firmware in non-volatile storage and executes code with its CPU. Interaction with external components is possible through the GPIO's and UART's. In this way the microcontroller 509 controls field module 500's operation.

RTC 510 is typically a discrete electronic component, which keeps track of the current time and date. In an exemplary embodiment, microcontroller 509 has a hardware clock, which is merely a frequency standard for digital electronics, and does not count time in human units, therefore RTC 510 is utilized by field module 500 to count time in seconds, minutes, hours, day of the month, month, year and day of the week. In this manner, RTC 510 allows for schedules to be kept in a standard way (i.e. turn valve 2 on at 11:35 am, Feb. 24, 2008).

In one embodiment, in order to assure that RTC 510 is constantly supplied with an electrical power source, RTC 510 may utilize a standard lithium-ion watch cell as a battery backup that will last for up to ten years with no external power source connected, however, in another embodiment, RTC 510 drains power from the same power source utilize to feed field module 500 without deviating from the scope of the present invention.

Power circuitry 512 may be any type of power circuitry adapted to supply an electrical power source to field module 500's components. However, in an exemplary embodiment, power circuitry 502 encompasses a set of modular sub-circuits that include a charging circuit, battery management circuit and power conditioning circuit. For example, and without limiting the scope of the present invention, a charging circuit may control the charging of a battery (via temperature, current or other feedback loops) from a charging device (e.g. a solar array, a generator, etc.). A battery management circuit may monitor the state of a battery and report the charge in addition to providing alarm signals for low-power or other non-desirable battery conditions. A power conditioning circuit may provide multiple stable voltages to the components in field module 500 (i.e. 3.3 v, 5 v, 1.8 v, etc.).

Furthermore, in another embodiment, field module 500 may be connected to a mains power (110 vac, 220 vac, etc.) and may require a suitable transformer located within field module 500 or externally. In such embodiment, the charging and battery circuits would be optional; however, the conditioning circuit may still be required. Again, power circuitry 512 may be any type of power circuitry adapted to supply an electrical power source to field module 500's components, without limiting the scope of the present invention.

In the illustrated embodiment, power circuitry 512 is connected to power source 513, which comprises photovoltaic cells, a battery and a charger, to constantly provide field module 500 with a source of electrical power without the need of any additional wiring.

Field module 500 further comprises of communications hardware 516. This hardware includes said input/output hardware 511, a transceiver 514, and an indicator panel 515.

Input/Output hardware 511 comprises modular interface daughter cards to provide for the dynamic components of the varied interfaces to valves, pumps and sensors. For example, and without limiting the scope of the present invention, a valve control daughter card may be connected to field module 500's main circuit board (or hardware layer 502) and thus provide an interface between microcontroller 509 and the valves, pumps or sensors, which field module 500 may be adapted to control.

This configuration of input/output hardware 511 allows field module 500 to be customized for a specific application, and for additional functionalities to be added if a new sensor or valve is needed to interface with field module 500.

Transceiver 514 is the field module 500's primary means of communication with the central control server. Transceiver 514 may be any type of transceiver known in the art for sending and receiving data packets in accordance with the present invention. However, in an exemplary embodiment, transceiver 514 is an original equipment manufactured (OEM) radio frequency (RF) module sourced from a known manufacturer. For example, and without limiting the scope of the present invention, transceiver 514 comprises an ORM RF module, which utilizes a ZigBee™ protocol to form and communicate over a self healing mesh network. It is a known specification for a suite of high level communication protocols using small, low-power digital radios based on the IEEE 802.15.4 standard for wireless personal area networks (WPAN's). ZigBee™ is targeted at RF applications which require a low data rate, long battery life, and secure networking. Therefore, this known technology is desirable because it is simpler and less expensive than other WPAN's, such as Bluetooth™.

Indicator panel 515 may typically comprise simply of a few light emitting diodes (LED's) or a seven-segment display located on an external surface of field module 500. Indicator panel 515's purpose is to relay information regarding status or malfunction to an observer physically viewing the unit itself. Indicator panel 515 may be useful in the event of a transceiver malfunction, in which case the unit is unable to communicate on the network, or for a simple visual check on status of a unit when visible. For example, and without limiting the scope of the present invention, indicator panel 515 may inform an observer that it is malfunctioning, low on battery, or that it has been disconnected from another component such as a valve or pump. Although this information is preferably communicated by field module 500 directly to the central control server, it may be desirable to further alert any personnel that may be physically inspecting an irrigation field.

It is understood that in the present disclosure, while it may be desirable to include all the elements described above in relation to field module 500, other alternative embodiments may not necessarily employ use or include every element of field module 500. For example, field module 500 may not include an indicator panel such as indicator panel 515 without deviating from the scope of the present invention.

Figure 6:
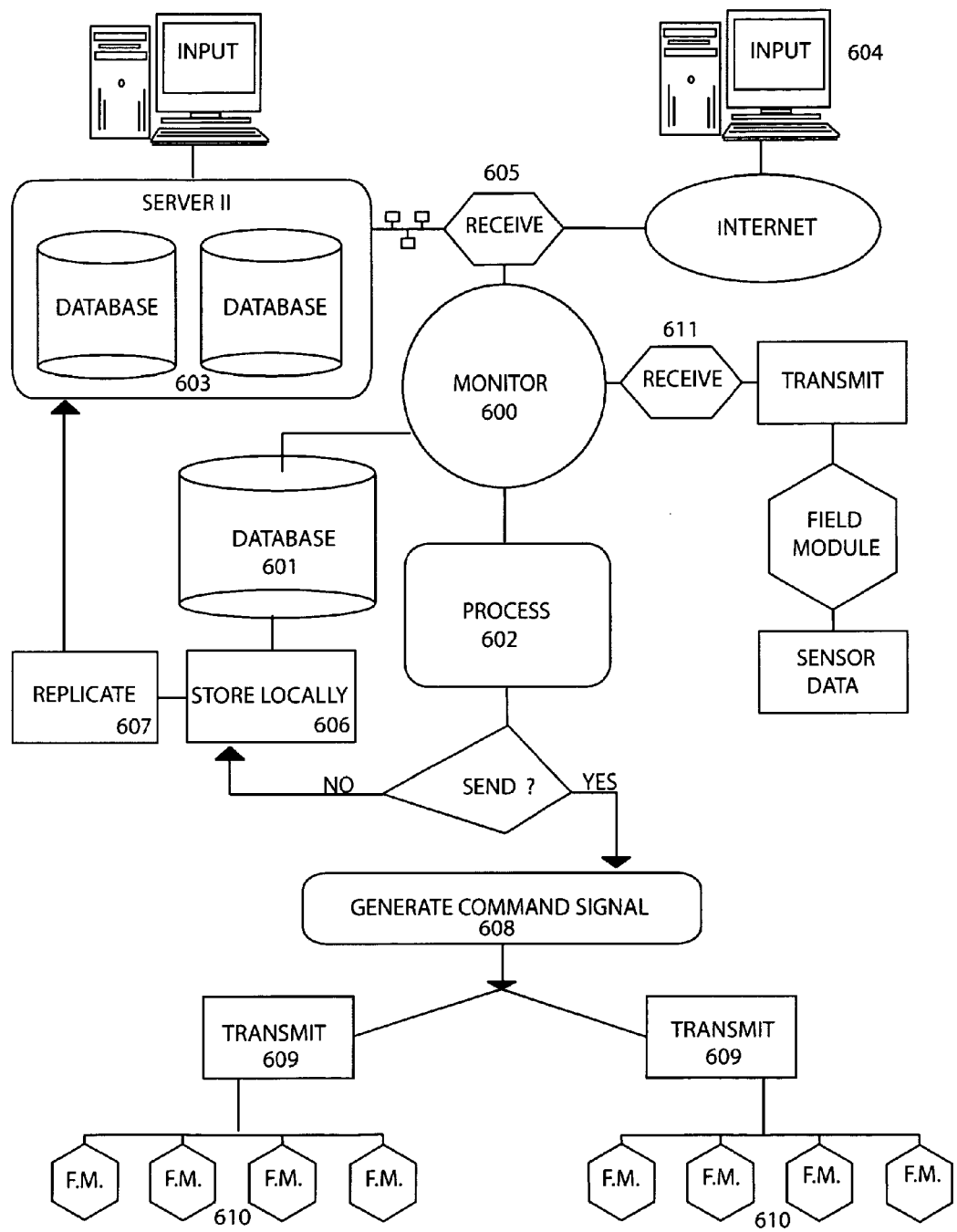
FIG. 6 illustrates a control diagram of a control server implementing one method of monitoring, generating, and sending command signals to be distributed throughout a plurality of field modules, in accordance with an exemplary embodiment of the present invention.

FIG. 6 illustrates a flow chart of a control server implementing one method of monitoring, generating, and sending command signals to be distributed throughout a plurality of field modules, in accordance with an exemplary embodiment of the present invention. Unless explicitly stated, the method embodiments described in the present disclosure are not constraint to a particular order or sequence. Additionally, some of the described methods or elements herein may occur or be performed at the same point in time.

A central control server is typically constantly monitoring an irrigation system at step 600. This may comprise comparing a first status to second status, wherein the first status represents the state of the entire system at previous point in time, while a second status may be a system state at present point in time. These states may comprise data stored in local database 601, a remote database 603, or may come from an external input 604.

For example, and without deviating from the scope of the present invention, a site manager may add additional information about a remote location being monitored by the central control server. This data is input via an access station and sent over the internet. The central control center receives the data at step 605, where a listening process may distribute the information to a monitoring process at step 600.

The central control server is typically in a constant state of processing. Multiple processes may be calculated at any one time and different processes are working separately to process different types of data.

In an exemplary embodiment, a central control server, in accordance with the present invention, includes software comprising a multiplicity of separate processes. For example, and without limiting the scope of the present invention, such independent processes may include a listening process, a monitoring process, a scheduling process, a calculator process—all of which make up a multithreaded software component for the server based irrigation system.

In one embodiment, a listening process is in charge of the sole function of listening for incoming data on a network gate way and scan that data for distributing to an appropriate destination in the network for processing—for example, and without limiting the scope of the present invention, a listening process may scan an incoming sensor data packet at step 611 and distribute to the monitoring process at step 600 to deliver the sensor data packet to the appropriate processing at 602, such as delivering sensor data to a sensor processor at step 602.

Alternatively, in said example, said data packet may comprise a status data from a remote server 603, thus a listening process may receive said status data at step 605 and distribute the data to a monitoring process at step 600; the monitoring process (upon recognizing or identifying said data as status data) in turn delivers the status data sent to a database process at step 602.

In yet another example, a listening process may receive data related to an irrigation schedule at step 605 and distributed to monitoring process at step 600; a monitoring process may then deliver said data an appropriate algorithm such as a scheduling process at step 602.

Thus, in an exemplary embodiment, monitoring, listening, calculating, or otherwise processing data, is accomplished via a multithreaded application, wherein several processes interact; each process in charge of a different function (independently of each other).

Processed data at step 602, which has been monitored and properly delivered to the appropriate algorithm, may be automatically stored or otherwise delivered to one or more locations for execution, for example, and without limiting the scope of the present invention, if said processed data comprises data for generating a control signal for some action to be performed and compensate for a change in the overall state of the system.

Alternatively, such data may be inventory data which has no immediate effects on scheduling, and no other action must be taken, then it may be desirable to store the data locally or on a remote database. For example, and without limiting the scope of the present invention, a site manager may provide the central control server with an input that is relevant to a change, which necessitates immediate action, a processor at step 602 may decide to generate a command signal.

Thus, processing data at step 602 may be followed by a determination whether to store data. If sent to be stored, a determination of weather to store that data locally or remotely, for example send the data to a slave server or any other location such as remote database 603 may be made by the system.

The processing data at step 602 may alternatively be followed by a determination to send a signal to one or more locations comprising a field matrix. The signal may be delivered to a single unit, a few units or an entire matrix of field modules.

Thus, at step 608 a command signal may be generated, which may be transmitted at step 609 utilizing one or more network bridge connections for one or more field module matrices. Upon relaying the command signal, a single unit or multiple units actuate the command at step 610. Actuation may comprise a number of commands, such as turning off a valve, shutting off a pump, or relaying a command signal to another field module within a field module matrix.

In an exemplary embodiment, all events, whether data sent directly to generate and execute a command or data processed for storing in database 601, will be stored automatically in database 601 at step 606.

At step 607, another determination may further comprise whether to replicate said stored data for storing said data redundantly elsewhere, for example in a data base at a remote server 603.

Figure 7A:
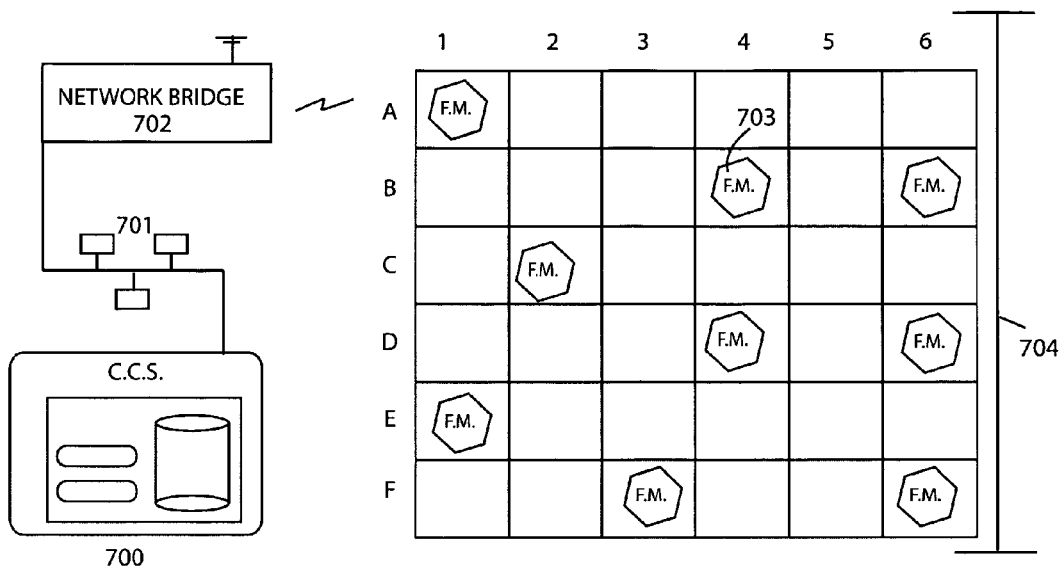
FIG. 7(a) illustrates one embodiment of the present invention, wherein a central control server transmits data to a plurality of field modules utilizing single hop, or multi-hop techniques of sending and receiving data. The field modules are shown in a grid, which represents their physical location in a particular irrigation controlled zone.

FIG. 7(a) illustrates one embodiment of the present invention, wherein a central control server transmits data to a plurality of field modules utilizing single hop, or multi-hop techniques of sending and receiving data. The field modules are shown in a field module matrix, which represents their physical location in a particular irrigation controlled zone.

Central control server 700 is shown connected to a network bridge 702 via LAN connection 701. Through network bridge 702, central control server may send a command signal to one or more of the field modules 703, which are located in an irrigation zone herein represented by field module matrix 704.

Depending on the size of field module matrix 704, central control server 700 may use multi-hop or single hop transceiver methods to transmit a command. For example, and without deviating from the scope of the present invention, central control server sends a command signal to field modules 703 to open a valve controlled by a unit at location F-6 of field module matrix 704. If field module matrix 704 is a very large irrigation zone, network bridge 702 may not have the capacity to send a signal that far. Thus, a signal may be sent to a unit at location A-1, relayed to location C-2, then location D-4, then location D-6, and finally transmitted to the unit at location F-6.

This configuration of field modules 703 allows a field module matrix in accordance with the present invention, to be extended or shortened by implementing more or less field modules. Every time a field module is implemented in a matrix, each field module is able to detect and report that information back to central control server 700. Therefore, a field module matrix is constantly adaptable to a variety of changes that may occur in an irrigation landscape.

The field module matrix or field module matrix 704, which is made up of individual modules 703, is typically self-healing or adaptable to a dynamic environment. In an exemplary embodiment of the present invention, field modules 703 are configured for constantly reporting their location and evaluating the field module matrix parameters. For example, and without deviating from the scope of the present invention, a maintenance personnel or field worker may implement an additional field module into field module matrix 704 or remove a field module from field module matrix 704. Field module matrix 704 if designed to reconfigures itself by processing the necessary calculations.

This self-healing element of field module matrix 704 is desirable particularly for dynamic situations wherein constant changes may be experienced in the field, or a particular irrigation zone. For example, and without limiting the scope of the present invention, an object may be temporarily stationed in field module matrix 704 so as to block or disrupt a particular signal path commonly used by field matrix 704. Sometimes, large work equipment is temporarily placed in an irrigation field such as heavy machinery, or large vehicles. Because field module matrix 704 is self healing, the matrix will reconfigure itself to compensate for the obstructing object.

Thus, each field module 703 is configured to make certain simple, yet advantageous calculations or determinations when transmitting information from one module to the next or from a field module to a control server. Embodiments describing field module processing such calculations and the advantages of accordingly configuring a field module is discussed in turn.

Figure 7B:
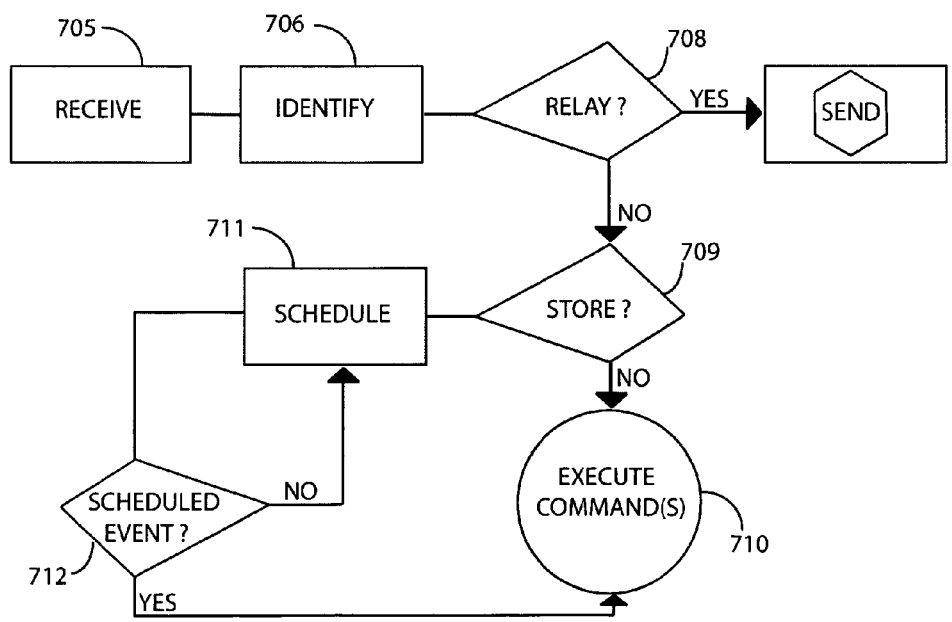
FIG. 7(b) is a block diagram depicting one method for field modules to send and receive information, in accordance with one embodiment of the present invention.

FIG. 7(*b*) is a flow chart depicting one method for field modules to send and receive information, in accordance with one embodiment of the present invention. Unless explicitly stated, the method embodiments described in the present disclosure are not constraint to a particular order or sequence. Additionally, some of the described methods or elements herein may occur or be performed at the same point in time.

By way of example, and without limiting the scope of the present invention, central control server 700 may send a command signal to schedule a shut-off for a particular pump. Thus, at step 705 one of the modules 703 may receive that command signal. At step 706, the unit may identify an address for the signal's destination and at step 708 may make a determination on whether the signal matches its own address or whether the signal is sent to be relayed to another unit with the matching destination address. If the signal is received by a module at location A-1, and the pump is controlled at location C-2, then the signal is relayed to that destination or the next available unit, depending on the distances and configuration of grid 704.

In an exemplary embodiment, field modules are configured for processing or making certain determinations based on the entire matrix status. Such determinations include whether to send a signal via a more direct rout to save time or via a less direct rout in order to conserve power—such determinations may be made at step 708, and are ultimately controlled by parameters set by central control server 700.

This is desirable to ultimately optimize the entire system for whatever purposes the system requires. For example, and without limiting the scope of the present invention, transceiver signals may degrade every square of a distance thus more power may be required to send a signal from one module to the next depending on the zones characteristics. Thus, if that same signal is sent via an 8 hop, multi-hop method, power or energy may seriously be conserved, if sent single hop, a command may be sent faster but will drain more power.

Therefore, if a signal is being sent to another field module in field module matrix 704, at step 706 an identification is made of where the data needs to be sent to, and at step 708 a determination in accordance with the above mentioned parameter may be made to relay and send the data to either the next field module in a multi-hop sequence, or directly to the targeted field module for which the data is being sent to.

If the signal's destination address matches the unit's location address and identified as such at step 706, then another determination at step 709 may be processed such as whether to store data at locally or directly execute a command at step 710. For example, a scheduled shut-off may be a real time command, or a command to be performed at a later time. In the event that the scheduled shut-off time is in the present, then the unit executes the command by actuating the shut-off valve to which it is connected to. In the event the scheduled shut-off time is in the future, or is to be repeated in intervals, then the scheduled shut-off is stored locally in the unit's schedule and the information is scheduled at step 711. While in standby, the unit may await for other signals to be relayed, to be executed or to be stored. Upon a scheduled event time, the unit executes the command signal by actuating the proper device.

At 712 may be part of such standby mode wherein a real time clock or similar process monitors whether a scheduled event is due, looping until a scheduled event occurs and thus a command is executed at step 710.

A field module matrix is also capable of reporting data, and may constantly be reporting information to a central control server. For example, a field module matrix may generate a report on the number of field modules in the matrix, whether there was an additional module installed or removed from the matrix, or report sensory data received from a sensor or relayed via another field module.

Figure 8A:
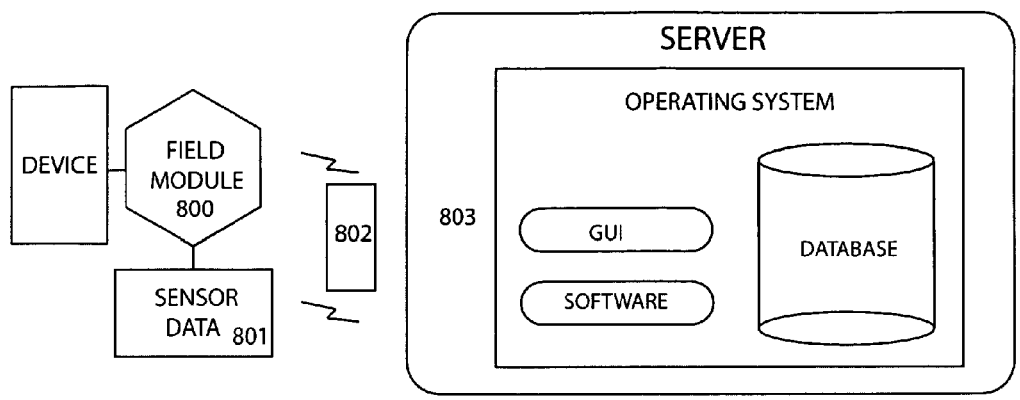
FIG. 8(a) illustrates a field module reporting sensor data to a server controller, in one embodiment of the present invention.
Figure 8B:
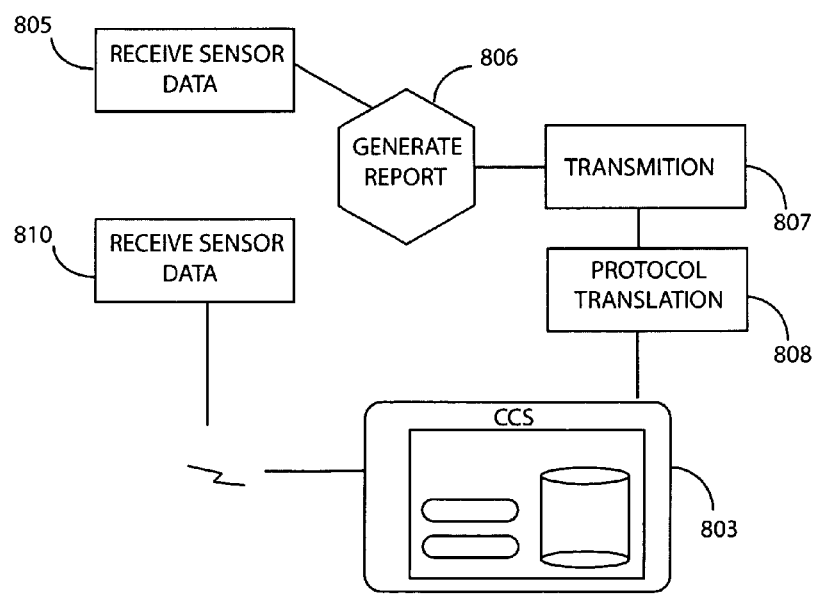
FIG. 8(b) is a block diagram depicting a method for sensor data transmission between the field module and server controller depicted in FIG. 8(a), in accordance with one embodiment of the present invention.

FIG. 8(*a*) illustrates a field module reporting sensor data to a server controller, in one embodiment of the present invention. A field module may be connected to one or more sensors to report on sensory data relevant to an irrigation system. For example, field module 800 may receive data from either a sensor it is connected to or another sensor relaying that sensory data back to central control server 803 via a network bridge adapter 802. Furthermore, field module 800 may also generate a report based on data perceived from a device field module 800 controls.

FIG. 8(*b*) is a flow chart depicting a method for sensor data transmission between the field module and server controller depicted in FIG. 8(*a*), in accordance with one embodiment of the present invention. Unless explicitly stated, the method embodiments described herein are not constrained to a particular order or sequence. Additionally, some of the described methods or elements herein may occur or be performed at the same point in time.

At step 805, a sensory data may be received by field module 800. Field module 800 may then generate a report at step 806 depending on the type of sensory data that has been received. For example, and without limiting the scope of the present invention, sensory data may comprise light levels, water levels, soil related data, or any other type of sensory data.

Upon generating a report at step 806, at step 807 field module 800 may transmit the data to central control server 803 via network bridge 802. At step 808, network bridge 802 may translate to appropriate protocol to properly deliver the information to central control server 803.

Furthermore, sensory data may comprise data from sensors not connected within a field matrix but for example, sensors delivering weather information from sources outside an irrigation system. In such circumstances, at step 810, central control server may receive updated information via user inputs, other servers, or external sensing devices, without deviating from the scope of the present invention. In this manner, each field module matrix may report back to an irrigation control server in accordance with the present invention.

A server-based irrigation control system in accordance with the present invention may perform a multiplicity of functions depending on the complexity of the irrigation parameters for a particular field, or network of fields, monitored and controlled by one or more control servers. For example, and without limiting the scope of the present invention, a central control server may be configured to implement irrigation related algorithms, calculators, schedulers, databases, protocols, and various other types of processes for providing: 1) a hydraulic analysis for individual components, or the overall irrigation system; 2) interpolation of sensor data throughout one or more irrigation networks; 3) localization of zone evapotranspiration/sensor data for one or more irrigation zones at one or more locations; and 4) algorithm calibration for individual processes, or for all processes throughout the overall irrigation system.

Example 1

Hydraulic Analysis

In an exemplary embodiment, a hydraulic analysis is used by the system to formulate an irrigation schedule based on the irrigation system's design specifications and parameters. By calculating or processing data to generate determinations based on the hydraulic analysis of the entire system, processes monitored and controlled by a server, may maximize system flows while adhering to flow restrictions In such exemplary embodiment, one or more processes that make up a software or software component may process certain information in order to optimize system parameters. For example, and without limiting the scope of the present invention, a pipe's length, inner diameter, and material composition for a given flow may affect how much pressure is lost as a result. Such processes may implement use of known methods and formulas such as the D'Arcy-Weisbach equation, the Hazen-Williams formula, or any other formulation for determining parameters such as pressure loss.

For example, greater flows result in higher loss of pressure for a given pipe. Particularly in industrial size irrigation schemes, there is usually a strict watering window. This may require thousands of gallons of water to flow throughout the system in a matter of just a few hours. Sprinkler heads also have minimum pressure requirements, thus the total friction loss from the pump to the sprinkler subtracted from the pressure at the pump must be at least the minimum operating pressure of the sprinkler head. Most commercial pump stations are designed such that the output is altered in real time to maintain a constant preset pressure, regardless of flow (i.e. within the pumps and operating range).

Thus, a well equipped server-based system in accordance with the present invention may implement a variety of methods to process, calculate and make determinations when monitoring and controlling one or more field module matrices, particularly if more than one irrigation field may be involved.

Without limiting the scope of the present invention, and purely by way of example, the pressure loss (or major loss) in a pipe, tube or duct may be expressed in one embodiment of the present invention, by implementing algorithms, calculators, or processes that utilize the D'Arcy-Weisbach equation:

$$\Delta p = \lambda (1/dh)(\rho v^2/2) \tag{1}$$

Where, $\Delta p$ is the pressure loss (Pa, N/m2); $\lambda$ is the D'Arcy-Weisbach friction coefficient; 1 is the length of duct or pipe (m); dh is the hydraulic diameter (m); and $\rho$ is the density (kg/m3).

The Hazen-Williams formula may also be used to calculate the pressure loss in a length of pipe due to friction dependent on the flow. This equation is commonly used for pressure drop calculations and may be implemented with water distribution systems, and irrigation systems, in accordance with practice of the present invention. For example, a central control server may comprise processes configured to calculate pressure loss as follows:

$$P_d = \frac{4.52 \, Q^{1.85}}{C^{1.85} \, d^{4.87}} \tag{2}$$

Where, $P_d$ is the pressure drop in pounds per square inch/foot; Q is equal to the flow in gallons per minute; C=factor (i.e. roughness or friction loss coefficient)—the higher the C factor, the smoother the pipe; and d is equal to the inside hydraulic diameter (in inches). Alternate forms of the Hazen Williams equation exist, which may be alternatively used or additionally implemented with a particular system for efficiency or simplicity depending on the known variables of a given irrigation system, for example:

$$V = 1.318 C R_h^{0.63} S^{0.54} \tag{3}$$

Where, V is the velocity (in feet per second); C=factor (i.e. roughness or friction loss coefficient); $R_h$ is the hydraulic radius (in feet); and S is equal to the energy gradient or friction slope (hf/L).

A system in accordance with the present invention may utilize one or more of these formulas depending on the system's design specifications. Furthermore, by equipping a central control server with several different methods for processing or deriving irrigation relevant data, the server may choose the most efficient methods to perform those processes and generate control signals depending on the known values and intended applications for the desired determinations.

In one embodiment, a server-based controller may implement the international system of units (SI), for compatibility with world wide irrigation schemes, wherein the modern form of the metric system and the world's most widely used system of units is utilized. This may be desirable for worldwide compatibility of a central control server-based irrigation system in accordance with the present invention wherein several systems in different parts of the world may be monitored and controlled. This may be accomplished by implementing software or algorithms capable of processing different types of measuring systems, for example in addition to the above mentioned methods, the present invention may further implement the Hazen Williams Equation in utilizing the SI system:

$$Q = 0.849 C A R_h^{0.63} S^{0.54} \tag{4}$$

Where, Q is equal to the volumetric flow rate; C=factor (i.e. friction loss coefficient); A is equal to a cross-sectional area of flow; $R_h$ is equal to a hydraulic radius; and S is the slope of energy grade line.

Whether utilizing one of the above mentioned methods, or any equivalent method, a hydraulic analysis in accordance with the present invention comprises several steps. Again, unless explicitly stated, the method embodiments described in the present disclosure are not constraint to a particular order or sequence. Additionally, some of the described methods or elements herein may occur or be performed at the same point in time.

In an exemplary embodiment, the server-based irrigation system may analyze, through sensors and/or by calculations, the flow through each section of a pipe or pipe system, the output ratio of the pump station(s), and the pressure at key points in the system (sprinklers, laterals, mains, etc.). Processing these parameters allows the server-based irrigation controller to adjust which zones are activated to best utilize available time and flow capacity.

In one embodiment adjusting the zones may be calculated ahead of time to create a sequence and concurrency of zones to activate, and may also be monitored and adjusted during the watering window to further tune the system. Furthermore, historical data may also be used for tuning of relevant parameters.

Example 2

Interpolation of Sensor Data

In an exemplary embodiment interpolation of sensor data is used to generate data and make deductions related to certain parameters, or characteristics of one or more irrigation networks within the server controlled irrigation system. Because interpolation is well understood to those skilled in the art, the present disclosure will only briefly define the method. In the present invention, interpolation may refer to the known mathematical subfield of numerical analysis, involving a method of constructing new data points within the range of a discrete set of known data points, wherein a number of data points, obtained by sampling or experiment, are utilized to construct a function which closely fits those data points.

By using such known methods, software in accordance with the present invention, may be configured with algorithms, calculators or processes that may be used for interpolation of sensor data to provide any point in the system with a value for a given sensor, even for a point in the field in which a sensor does not exist. While pressure sensors, soil moisture sensors, and other sensors can provide data for various conditions in a system, sensor placement often restrict measurements to the sensors' immediate vicinity. Thus, by processing interpolation of the sensor data, a central control server, in accordance with the present invention, can provide the irrigation system with otherwise unknown values.

Typically, a system configured for interpolation of sensor data, in accordance with the present invention, may comprise software configured for monitoring and gathering information from the system's database, available sensors, geographic or topological layout, or any other relevant field system information, to interpolate available data system-wide in a manner so that reliable data can be provided for any part of a system, regardless of sensor availability at an exact location.

For example, and without limiting the scope of the present invention, a pipe comprising a pressure sensor at one point, and a flow sensor connected some 200 feet down away from that point, may be analyzed by the server utilizing such software to gather information along the entire length of said pipe. Using one or more variations of the Hazen-Williams formula (e.g. formulas (2), (3), or (4) described above) the system may determine the pressure at any point between or on either side of the sensor. Naturally, similar, but much more complex calculations must be performed within a dynamic system comprising many interrelated components (i.e. systems wherein changing pressures or fluctuating flow rates are common).

Example 3

Localization of Zone ET/Sensor Data

In an exemplary embodiment, a server-based system in accordance with the present invention uses software configured for localization of zone evapotranspiration/sensor data to provide an accurate water requirement metric tailored to each irrigation zone's characteristics.

Evapotranspiration (ET) is the consumptive use of water by the combined processes of plant transpiration and soil evaporation, which causes the loss of water from an irrigation field's surface. There are multiple known methods that may be developed to estimate crop ET, and implementing any such methods in accordance with the present disclosure will not deviate from the scope of the present invention. ET is typically measured in $ET_O$ for potential or evapotranspiration. This value is then adjusted based on the crop, soil and microclimate for that zone/valve as an "actual" evapotranspiration.

Typically, a system in accordance with the present invention uses weather data and known methods to provide an estimate of reference or potential evapotranspiration ($ET_O$), to convert the $ET_O$ into an absolute ET. For example, and without limiting the scope of the present invention, by using a multiplicative factor known as a crop coefficient ($K_C$) a crop's estimated ET requirements may be calculated.

It is well known in the art that crop coefficients ($K_C$) are the specific evapotranspiration values for an irrigation field's vegetative characteristics, which may be generated by collecting data from sensors or other information gathering means and referencing potential evapotranspiration data to estimate the crop's evapotranspiration requirement ($ET_C$). $ET_C$ may be calculated by multiplying the crop coefficient ($K_C$) by the referenced or potential evapotranspiration value ($ET_O$), thus:

$$ET_C = K_C \times ET_O \tag{5}$$

Since there are multiple environmental and biological factors that may affect ET, it may be desirable to implement a number of data gathering devices or means, whether sensors or otherwise, to account for a variety of environmental field data including without limitation solar radiation, field temperature, atmospheric dryness (vapor pressure deficit), wind, and soil moisture. Similarly, biological factors affecting ET may be accounted for by gathering information pertaining to field data including, without limitation: type of vegetation, foliage geometry, and foliage density.

In an exemplary embodiment, upon system installation, a system plan or an "as-built" specification (i.e. proportional blue print of landscape and system components) implementing GPS or other location coordinates may be created. In one embodiment, the system plan may include an irrigation system's layout as well as soil conditions and crop/plant areas. In another embodiment, a system plan may further include shade producing objects such as plants or structures that affect underlying plants' exposure to light and water usage.

Thus, the amount of water that should be expelled from a valve may be calculated by considering factors such as: soil type (i.e. infiltration rates, field capacity, etc.); crop coefficients (i.e. plant characteristics); micro-climates (i.e. shaded areas, south-facing walls, etc.); past and future watering windows; and any other information relevant to the area said valve affects. In such exemplary embodiment, software components or processes may be configured to extract all relevant data and calculate the desired watering schedules taking into account the evapotranspiration variables briefly discussed above.

Example 4

Algorithm Calibration

In an exemplary embodiment, a server-based irrigation system in accordance with the present invention also provides algorithm calibration to further increase accuracy of calculations. Software located in the control server may process many hundreds or thousands of calculations per day, recording solutions and storing logs of calculations in its database(s) for future use or reference. Thus, it is desirable to configure software for optimum accuracy.

Although most of the results of software's calculations may not be able to be directly verified, through deduction said results may be evaluated. In other words, by analyzing the outcome of certain actions taken from calculated data, an irrigation control server may be configured to evaluate the accuracy of the original calculations and thus adjust certain parameters.

Furthermore, there may be multiple avenues to a particular solution, for example, determining line pressures or minimum flow requirements using the several formulas briefly discussed above. Therefore, implementation of an algorithmic calibration process with an irrigation control server as described herein enables the irrigation control server to evaluate each avenue, and then compare solutions to find a more time efficient solution, a more energy conserving solution, or any solution that may be more desirable for any other given purpose.

This may be achieved either by configuring software with a set of rules (e.g. err on the side of over watering, minimize electricity used, etc.), or by presenting such parameters for a user to decide—for example, and without limiting the scope of the present invention, an irrigation control server in accordance with the present invention may send messages, alerts, or alarms throughout a system and make that data available through user interfaces or GUI's, either locally or remotely, depending on the irrigation scheme.

A system and method for wireless irrigation utilizing a centralized control server and plurality of field modules has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

The invention claimed is:

1. An irrigation system, comprising:
a server adapted to control an irrigation area, wherein the server is configured for:
receiving data pertaining to the irrigation area, and generating a control signal based on the data;
an irrigation field module matrix dynamically reconfigurable to compensate for changes in the irrigation area, the irrigation field module matrix comprising:
a plurality of field modules, adapted for single-hop and multi-hop communication for receiving the control signal and sending the data, wherein one or more field modules is adapted to: send the data pertaining to the irrigation area to the server, receive the control signal from the server, and control a plurality of irrigation components based on the control signal; and
a wireless network adapter, communicatively coupled between the server and the irrigation field module matrix, adapted to route the data from the field matrix module to the server and route the control signal from the server to the field module matrix.

2. The system of claim 1, wherein the wireless network adapter translates between a protocol in use by the field modules and the server.

3. The system of claim 2, wherein the server is configured to control a plurality of irrigation areas utilizing a plurality of field module matrices.

4. The system of claim 2, wherein generating the control signal further comprises generating an irrigation schedule.

5. The system of claim 2, wherein generating the control signal further comprises making determinations based on a hydraulic analysis of the data.

6. The system of claim 2, wherein generating the control signal further comprises making determinations based on an interpolation of sensor data gathered from the data.

7. The system of claim 2, wherein generating the control signal further comprises making determinations based on evapotranspiration data gathered from the data.

8. The system of claim 2, wherein the server further comprises a user interface adapted to provide a user remote access to the server.

9. The system of claim 2, wherein the data pertaining to the irrigation area comprises system status information.

10. The method of claim 1, wherein the changes in the irrigation field are an addition or a deletion of a field module to the field module matrix.

11. The method of claim 1, wherein the changes in the irrigation field are based on environmental factors.

12. A method for controlling an irrigation system, comprising the steps of:
creating an irrigation field module matrix by placement of a plurality of field modules within an irrigation area, the field module matrix dynamically reconfigurable to compensate for changes in the irrigation field;
sending data pertaining to the irrigation area from the field modules to a server adapted to receive the data;
generating a control signal based on the data;
sending the control signal to the field modules adapted to receive the control signal;
controlling a plurality of irrigation components coupled to the field modules based on the control signal;
enabling a wireless network adapter, communicatively coupled between the server and the irrigation field module matrix, adapted to route the data from the matrix to the server and route the control signal from the server to the matrix; and
configuring the plurality of field modules for single-hop and multi-hop communication for receiving the control signal and sending the data.

13. The method of claim 12, wherein the wireless network translates between a protocol in use by the field modules and the server.

14. The method of claim 13, wherein generating the control signal further comprises generating an irrigation schedule.

15. The method of claim 13, wherein generating the control signal further comprises making determinations based on a hydraulic analysis of the data.

16. The method of claim 13, wherein generating the control signal further comprises making determinations based on an interpolation of sensor data gathered from the data.

17. The method of claim 13, wherein generating the control signal further comprises making determinations based on evapotranspiration data gathered from the data.

18. The method of claim 13, further comprising the step of monitoring a performance of the server via algorithmic calibrations pertaining to one or more irrigation related processes.

19. The method of claim 13, further comprising the step of configuring the server with a user interface adapted to provide a user remote access to the server.

20. An irrigation system, comprising:
- a server adapted to control one or more irrigation areas, the server including a user interface adapted to provide a user remote access to the server, wherein the server is configured for:
  - receiving data pertaining to the one or more irrigation areas, wherein the data pertaining to the irrigation area comprises a system status, and
  - generating a control signal based on the data;
- an irrigation field module matrix dynamically reconfigurable to compensate for changes in the one or more irrigation areas and adapted for single-hop and multi-hop communication for receiving the control signal and sending the data, the irrigation field matrix comprising:
  - a plurality of field modules, wherein one or more field modules is adapted to:
  - send the data pertaining to the irrigation area to the server,
    - receive the control signal from the server, and
      - control a plurality of irrigation components based on the control signal; and
    - a communication medium, communicatively coupled between the server and the irrigation field module matrix, adapted to route the data from the field module matrix to the server and route the control signal from the server to the field module matrix, wherein the communication medium further comprises a wireless network adapter which translates between a protocol in use by the field modules and the server; wherein generating the control signal further comprises:
    - generating an irrigation schedule,
    - making determinations based on a hydraulic analysis of the data,
    - making determinations based on an interpolation of sensor data gathered from the data, and
    - making determinations based on evapotranspiration data gathered from the data.

* * * * *